(12) United States Patent
Higashikubo et al.

(10) Patent No.: US 6,492,596 B1
(45) Date of Patent: Dec. 10, 2002

(54) FOAMABLE COMPOSITION AND COAXIAL CABLE HAVING INSULATING FOAM LAYER

(75) Inventors: Takashi Higashikubo, Amagasaki (JP); Hirokazu Kuzushita, Amagasaki (JP); Akito Niboshi, Fukui (JP)

(73) Assignee: Mitsubishi Cable Industries, Ltd., Amagasaki (JP)

( * ) Notice: Subject to any disclaimer, the term of this patent is extended or adjusted under 35 U.S.C. 154(b) by 83 days.

(21) Appl. No.: 09/616,307

(22) Filed: Jul. 14, 2000

(30) Foreign Application Priority Data

Jul. 19, 1999 (JP) .............................. 11-205404

(51) Int. Cl.$^7$ .............................................. H01B 17/00
(52) U.S. Cl. ............................ 174/137 B; 174/110 F; 174/110 FC; 174/116; 174/118
(58) Field of Search .................... 174/137 B, 138 R, 174/110 R, 110 PM, 110 FC, 110 F, 113 C, 116, 118

(56) References Cited

U.S. PATENT DOCUMENTS

| | | | | |
|---|---|---|---|---|
| 3,775,213 A | * | 11/1973 | Dunay | 156/244.23 |
| 4,737,547 A | * | 4/1988 | White | 525/193 |
| 5,574,074 A | * | 11/1996 | Zushi et al. | 521/143 |
| 5,602,223 A | * | 2/1997 | Sasaki et al. | 526/348.1 |
| 5,643,969 A | * | 7/1997 | Sakamoto et al. | 521/81 |
| 5,916,926 A | * | 6/1999 | Cooper et al. | 521/53 |
| 6,025,441 A | * | 2/2000 | Koshirai et al. | 525/199 |

FOREIGN PATENT DOCUMENTS

| | | |
|---|---|---|
| JP | 54 084288 | 7/1979 |
| JP | 03 195746 | 8/1991 |
| JP | 09 055120 | 2/1997 |

OTHER PUBLICATIONS

"Advanced Wire and Cable Compounds for Telecommunications," Union Carbide Chemicals and Plastics Company Inc. Catalog (Reference No. PP71–217) No Date.

* cited by examiner

Primary Examiner—Chau N. Nguyen
Assistant Examiner—W. David Walkenhorst
(74) Attorney, Agent, or Firm—Leydig, Voit & Meyer, Ltd.

(57) ABSTRACT

A foamable composition containing a base polymer containing a polyethylene mixture of a low density-polyethylene having a density of 0.91–0.925 g/cm$^3$ and a high density polyethylene having a density of 0.94–0.97 g/cm$^3$, and a fluororesin powder and/or a boron nitride powder as a nucleator, wherein the high density polyethylene has an swelling ratio smaller than that of the low density polyethylene and a melt flow rate greater than that of the low density polyethylene, and is contained in a proportion of not less than 50 percent by weight of the polyethylene mixture, and the base polymer has a shear viscosity (temperature:170° C., shear rate:1216 sec$^{-1}$) of not more than 3150 poise, and a coaxial insulating cable having an electrically insulating layer formed of a foam having an expansion ratio of not less than 70% and obtained by foaming the above foamable composition are provided. The insulating layer formed from the foamable composition has superior attenuation property and can be suitably used for a feeder antenna of a portable communication device.

4 Claims, 1 Drawing Sheet

FOAMABLE COMPOSITION AND COAXIAL CABLE HAVING INSULATING FOAM LAYER

TECHNICAL FIELD OF THE INVENTION

The present invention relates to a foamable composition and a coaxial cable having an insulating foam layer. More particularly, the present invention relates to a foamable composition and a foam suitable for a high frequency coaxial cable, particularly a coaxial insulating cable preferable for a trunk line of CATV and a feeder antenna of a portable communication device such as cellular phones, and to a coaxial cable having an insulating foam layer.

BACKGROUND OF THE INVENTION

Conventional foamable compositions used for the production of a feeder antenna of portable communication devices contain an olefin resin, such as polyethylene and polypropylene, and a so-called chemical foaming agent as a nucleator, such as 4,4'-oxybisbenzenesulfonyl-hydrazide (OBSH) and azodicarbonamide (ADCA). Conventional foams have been obtained by foaming the above-mentioned foamable compositions with a foaming agent such as various inert gases and hydrocarbon gas. In addition, the use of a fluororesin powder or boron nitride powder as a nucleator to obtain a foam having high electric property has been known.

While a feeder antenna of a portable communication device has been increasingly miniaturized and a higher frequency band has been employed in recent years, a coaxial cable having the above-mentioned conventional foam as an electrically insulating layer often fails to show required attenuation property due to its insufficient electric property.

The electric property of a foam has been so far improved by mainly studying nucleators and foaming agents. However, the present inventors took note of polyethylene to be foamed. As a result, it has been found that when a fluororesin powder or a boron nitride powder is used as a nucleator, the use of a specific polyethylene mixture consisting of a low density polyethylene and a high density polyethylene results in the production of a foam having unexpectedly high electric property. In addition, a small-sized coaxial cable having this foam as an electrically insulating layer has been found to exhibit superior attenuation property at a high frequency band.

The present invention is based on the above-mentioned new finding and aims at providing a foamable composition preferably used for a coaxial insulating cable having superior attenuation property, that is suitable for a feeder antenna of a portable communication device and the like, and a coaxial cable having an insulating layer made from the composition.

SUMMARY OF THE INVENTION

Such object can be achieved by the following foam able composition and coaxial insulating cable of the present invention.

The foamable composition comprises a base polymer comprising a polyethylene mixture consisting of a low density polyethylene and a high density polyethylene, and a fluororesin powder and/or a boron nitride powder as a nucleator, wherein the high density polyethylene has an SR smaller than that of the low density polyethylene and an MFR (melt flow rate) greater than that of the low density polyethylene, the high density polyethylene is contained in a proportion of not less than 50 wt %, and the base polymer has a shear viscosity (temperature: 170° C., shear rate: 1216 sec$^{-1}$) of not more than 3150 poise.

The coaxial insulating cable comprises an electrically insulating layer made of a foam having an expansion ratio of not less than 70% and obtained by foaming the above-mentioned foamable composition using an inert gas as a foaming agent.

DETAILED DESCRIPTION OF THE INVENTION

Figure 1:
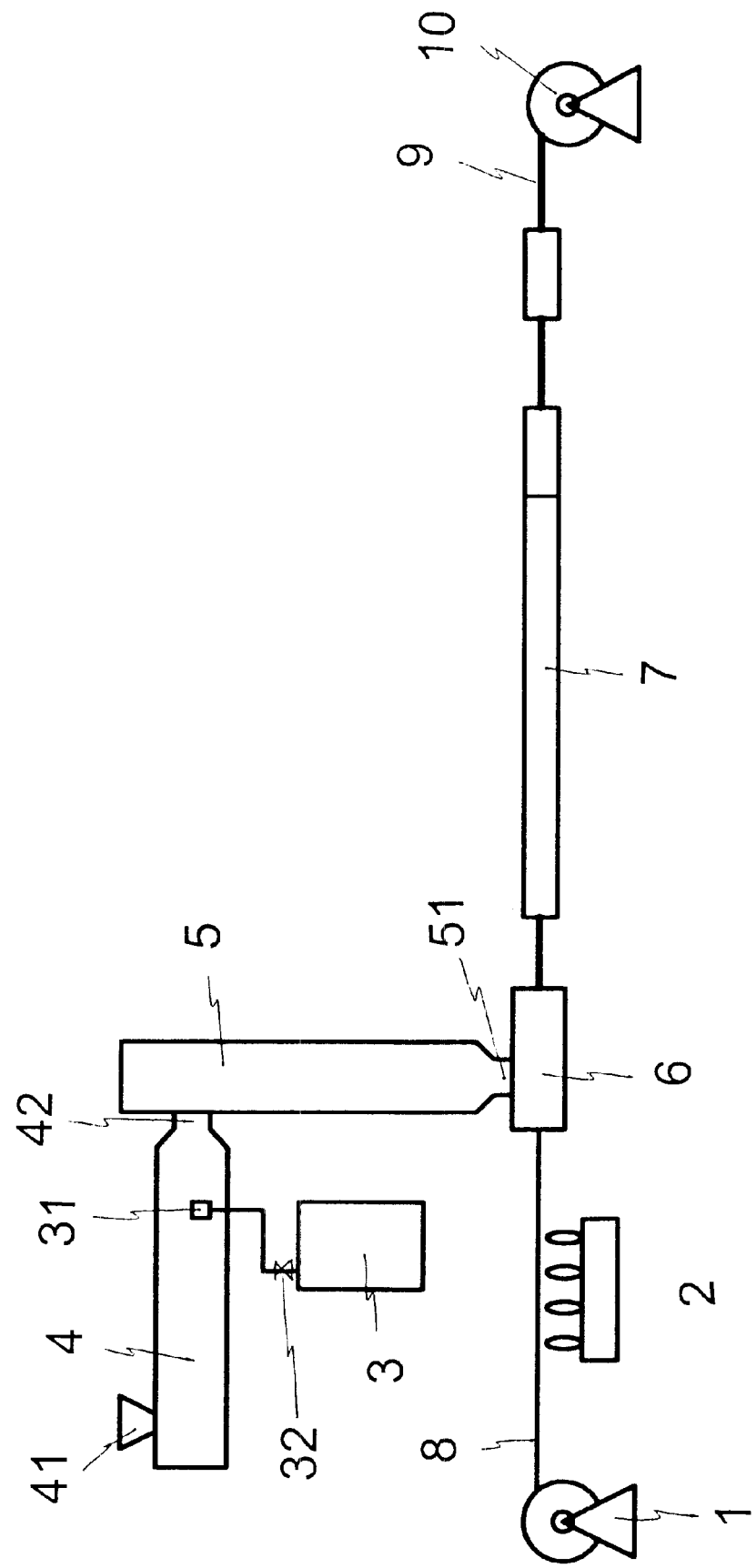
FIG. 1 shows one embodiment of the production apparatus used for the coaxial insulating cable of the present invention, wherein 1 is a conductor supply part, 2 is a conductor preliminary heater, 3 is a tank containing a foaming agent, 31 is a foaming agent injection nozzle, 4 is a first extruder, 5 is a second extruder, 6 is a crosshead of the second extruder 5, and 7 is a condenser.

The base polymer comprised in the foamable composition of the present invention comprises a polyethylene mixture of a low density polyethylene and a high density polyethylene, wherein the high density polyethylene is characterized in that (1) it has a smaller SR (swelling ratio) than that of the low density polyethylene, (2) it has an MFR greater than that of the low density polyethylene, and (3) it is contained in the polyethylene mixture in a greater amount than the low density polyethylene. The preferable MFR of the high density polyethylene is not less than 5. The base polymer has a low shear viscosity of not more than 3150 poise at a temperature of 170° C. and a shear rate of 1216 sec$^{-1}$. Due to these characteristics, the foamable composition of the present invention shows superior electric property at a high frequency band, where a feeder antenna of a portable communication device is operatable, as compared to conventional foamable compositions. When foamed in the presence of a fluororesin powder or boron nitride powder as a nucleator, a high expansion ratio of not less than 70% can be achieved. Therefore, the foam obtained from the foamable composition of the present invention shows superior attenuation property.

The foamable composition of the present invention comprises a base polymer comprising a polyethylene mixture of a low density polyethylene and a high density polyethylene, and a fluororesin powder and/or a boron nitride powder as a nucleator.

The low density polyethylene, which constitutes the polyethylene mixture, has a density of 0.91–0.925 g/cm$^3$.

When a low density polyethylene having a density of less than 0.91 g/cm$^3$ is used as the low density polyethylene, the resulting foam may include non-uniform cells, whereas when that having a density exceeding 0.925 g/cm$^3$ is used, a high expansion ratio may not be achieved.

The low density polyethylene preferably has a density of 0.915–0.922 g/cm$^3$.

The low density polyethylene has an SR of generally about 20–80, preferably about 40–60, and an MFR of generally about 0.1–10, preferably about 1–7, more preferably 1–less than 5.

Such low density polyethylene can be selected from low density polyethylene prepared by a typical high pressure process using oxygen or organic peroxide as a polymerization initiator; linear low density polyethylene prepared by a high pressure process using transition metal catalyst and (x-olefin; low density polyethylene and linear low density polyethylene prepared by a moderate pressure process such as solution polymerization, slurry polymerization, gas phase polymerization and the like, all using a Phillips catalyst, solution polymerization using a standard catalyst, and the like; low density polyethylene and linear low density polyethylene prepared by a low pressure process such as solution polymerization, slurry polymerization, gas phase polymerization and the like, all using a Ziegler catalyst; and the like.

The other component of the polyethylene mixture, a high density polyethylene, has a density of 0.94–0.97 g/cm$^3$, an SR smaller than that of the low density polyethylene used alongside and an MFR greater than that of the low density polyethylene.

When the high density polyethylene has a density less than 0.94 g/cm$^3$, the attenuation of a cable prepared therefrom tends to become greater. When the high density polyethylene has a density greater than 0.97 g/cm$^3$, the resulting foam tends to have a low expansion ratio. The high density polyethylene preferably has a density of 0.960–0.965 g/cm$^3$.

When the high density polyethylene has an SR the same as or greater than that of the low density polyethylene to be used alongside, the resulting foam contains broken cells that form continuous cells. When the high density polyethylene has an MFR the same as or smaller than that of the low density polyethylene to be used alongside, the attenuation of a cable prepared therefrom tends to become greater.

The SR of the high density polyethylene is preferably about 20–50, particularly about 30–40, smaller than that of the low density polyethylene to be used alongside. The MFR of the high density polyethylene is preferably about 5–9, particularly about 6–7, greater than that of the low density polyethylene to be used alongside. The high density polyethylene generally has an MFR of not less than 5, preferably about 5–9, more preferably about 7.5–8.5, and an SR of generally not more than 60, preferably about 10–40, more preferably about 15–25. When the high density polyethylene has an MFR smaller than 5, the attenuation of a cable prepared therefrom tends to become greater.

The high density polyethylene can be selected from high density polyethylene prepared by a moderate pressure process such as solution polymerization, slurry polymerization, gas phase polymerization and the like, all using a Phillips catalyst; high density polyethylene prepared by a moderate pressure process such as solution polymerization using a standard catalyst, and the like; high density polyethylene prepared by a low pressure process such as solution polymerization, slurry polymerization, gas phase polymerization and the like, all using a Ziegler catalyst; and the like.

The composition ratio of the low density polyethylene and the high density polyethylene in the polyethylene mixture to be used in the present invention is not less than 50 wt %, preferably not less than 60 wt %, more preferably not less than 70 wt %, of the high density polyethylene. The remaining part of the polyethylene mixture is the low density polyethylene. The proportion of the low density polyethylene in the polyethylene mixture is not less than 5 wt %, preferably not less than 10 wt %, more preferably not less than 15 wt %. When the proportion of the high density polyethylene in a polyethylene mixture is less than 50 wt %, the attenuation of a cable prepared therefrom tends to become greater.

The base polymer may contain, besides the above-mentioned polyethylene mixture, for example, other low polarity polymer such as medium density polyethylene (density :over 0.925 and less than 0.94), polypropylene, ethylene-propylene copolymer and the like. The proportion of the above-mentioned polyethylene mixture in the base polymer is not less than 80 wt %, preferably not less than 90 wt %.

The base polymer has a shear viscosity (temperature: 170° C., shear rate: 1216 sec$^{-1}$) of not more than 3150 poise, preferably not more than 3100 poise, more preferably not more than 3050 poise. When the shear viscosity is greater than 3150 poise, the attenuation of a cable prepared therefrom tends to become greater.

The base polymer of the foamable composition of the present invention may contain other additives as necessary, such as antioxidant, copper inhibitor, coloring agent and the like. The additives mentioned above often degrade the electric property of a foam. Therefore, the total amount thereof to be added is about 0.05–2.0 parts by weight, preferably about 0.1–1.0 part by weight, per 100 parts by weight of the base polymer.

In the present invention, the density, SR and MFR of the low or high density polyethylene, and the shear viscosity of the base polymer are respectively measured according to the following methods. [density]: measured at 20° C. according to the method defined in JIS-K-7112.

[MFR]: measured at temperature 190° C., load 2.16 kg using the melt indexer defined in JIS-K-7210 according to the method defined therein.

[SR (%)]: calculated according to the following formula $$SR(\%)=[(S-R)/R]\times 100$$

wherein S is an outer diameter of the extruded strands and R is an inner diameter of the orifice of the melt indexer, S and R being obtained from the measurement of MFR under the above-mentioned conditions.

[Shear Viscosity]: measured using Capillograph 1B manufactured by Toyoseiki at temperature 170° C. at shear rate 1216 sec$^{-1}$ according to the method defined in JIS-K-7199.

As the nucleator, a fluororesin powder and/or a boron nitride powder are/is used. The fluororesin may be any as long as it is a homopolymer, copolymer and the like of monomers containing fluorine and it can be prepared into a powder. Among others, a low polarity fluororesin having a dielectric constant (20° C., 60 Hz) of not more than 2.5 is preferable.

Examples of fluororesin include polytetrafluoroethylene (PTFE), tetrafluoroethylene-perfluoroalkyl vinyl ether copolymer (PFA), ethylene-tetrafluoroethylene copolymer (ETFE), tetrafluoroethylene-hexafluoropropylene copolymer (FEP), tetrafluoroethylene-ethylene copolymer, polyvinylidene fluoride (PVdF), polychlorotrifluoroethylene (PCTFE), chlorotrifluoroethylene-ethylene copolymer (ECTFE) and the like, with preference given to PTFE, PFA and ETFE, particularly PTFE.

The particle size and the amount of the nucleator are those typically employed for the preparation of a polyethylene foam. The average particle size is about 0.05–50 μm, and the amount to be used is about 0.01–5 parts by weight per 100 parts by weight of the base polymer. For improved fineness and uniformity of the foamed cells, the fluororesin powder preferably has an average particle size of about 0.2–10 μm, particularly about 0.2–5 μm, and the boron nitride powder preferably has an average particle size of about 0.2–30 μm, particularly about 0.2–10 μm.

The foamable composition of the present invention can be produced by weighing and mixing the above-mentioned base polymer, nucleator and other additives to be used as necessary, such as antioxidant, copper inhibitor, coloring agent and the like, each at a given ratio, and kneading them in a conventional kneader such as Banbury mixer, heat roll and the like. Alternatively, the polymer components such as low density polyethylene, high density polyethylene and the like are admixed in advance in a kneader to give a uniform polymer mixture, to which nucleator and other additives may be added and admixed.

The average particle size of a powder can be measured by the following method.

[Average Particle Size of Powder]: A measurement target powder is cast into water or an organic liquid, such as ethanol, and dispersed for about 2 minutes by the application of an ultrasonic wave of about 35–40 kHz. A dispersion containing particles in such an amount that makes the laser transmissivity (ratio of output light relative to incident light) of the dispersion 70–95% is subjected to a microtrack particle size analyzer to measure the particle size ($D_1$, $D_2$, $D_3$...) of each particle and the number of particles ($N_1$, $N_2$, $N_3$...) having each particle size, based on the scattering of a laser beam (the corresponding particle size (D) of each particle is automatically measured by microtrack particle size analyzer for particles having various shapes). Thus, the average particle size ($\mu$m) is calculated from the following formula (1) using the number (N) of particles present in the visual field and particle size (D):

$$\text{average particle size } (\mu m) = (\Sigma ND^3/\Sigma N)^{1/3} \quad (1)$$

A foam prepared from the foamable composition of the present invention preferably has a high expansion ratio, which is achieved by the use of an inert gas as a foaming agent, such as a foam having an expansion ratio of not less than 70%, particularly not less than 75%. The expansion ratio can be calculated from the following formula (2), wherein SS is the specific gravity of a base polymer and SF is the specific gravity of the foam. The specific gravity SS and specific gravity SF can be measured by the immersion method (Method A) as defined in JIS-K-7112.

$$\text{expansion ratio } (\%) = (SS-SF)/SS \times 100 \quad (2)$$

The above-mentioned foam is generally superior in electric property, particularly, the electric properties (dielectric constant, dielectric tangent, attenuation property and the like) at a high frequency band of about 100 M–10 GHz. Therefore, it is suitable for an electrically insulating layer of a wire or cable, insulation, soundproof material, wave absorber and various other uses. Specifically, since a coaxial insulating cable having an electrically insulating layer made of the foam shows superior attenuation property at the above-mentioned high frequency band, it is suitable for various communication cables, particularly for a trunk line of CATV and a feeder antenna of a portable communication device such as cellular phones.

The foamed coaxial insulating cable of the present invention can be produced by extruding the foamable composition of the present invention from under a high pressure in an extruder into an atmosphere having a lower pressure, in the presence of a foaming agent, according to a typical method. As the foaming agent, an inert gas, such as halogenated hydrocarbons such as dichlorodifluoromethane, dichloromonofluoromethane, monochlorodifluoromethane, trichloromonofluoromethane, monochloropentafluoroethane, trichlorotrifluoroethane and the like, nitrogen, carbon dioxide, helium, argon and the like are used. Of these foaming agents, an inert gas such as chlorofluorocarbon containing hydrogen atom (e.g., HCFC22, HCFC123, HCFC124 and HCFC142b), fluorocarbon without chlorine atom, nitrogen, carbon dioxide, helium, argon and the like, specifically argon, is particularly preferable, since it produces a uniform, minute and highly expanded foam. In addition, they are nondestructive to the ozone layer and is preferable for the protection of the environment.

The amount of the foaming agent to be used is not particularly limited. It is generally about 0.05–1 part by weight, particularly about 0.05–0.5 part by weight, per 100 parts by weight of the foamable composition. The foaming agent may be previously mixed with an organic polymer to be foamed, or supplied into an extruder from a foaming agent supply port formed on the barrel of an extruder.

FIG. 1 shows one embodiment of the production apparatus for the coaxial insulating cable of the present invention, wherein 1 is a conductor supply part, 2 is a conductor preliminary heater, 3 is a tank packed with a foaming agent, 31 is a foaming agent injection nozzle set on the barrel of the first extruder 4 to be mentioned later, 32 is a reducing valve, 4 is the first extruder, 41 is a hopper of the first extruder 4, 42 is a discharge end of the first extruder 4, 5 is the second extruder, 51 is a discharge end of the second extruder 5, 6 is a crosshead of the second extruder 5 and 7 is a condenser. The first extruder 4 is connected at right angle to the second extruder 5 via the discharge end 42.

Pellets prepared from the foamable composition are cast into the hopper 41 of the first extruder 4, and melt in the first extruder 4. The foaming agent is pressed into the first extruder 4 from a tank 3 via the reducing valve 32 and the foaming agent injection nozzle 31, and mixed with the above-mentioned melt. The mixture of the foaming agent and the foamable composition mixed in the first extruder 4 is transferred to the second extruder 5 via the discharge end 42. The transferred mixture is thoroughly mixed in the second extruder 5 and transferred to the crosshead 6 via the discharge end 51.

The optimal temperature of the first extruder 4 and the second extruder 5 in each barrel varies somewhat according to the composition of the foamable composition and the kind of the foaming agent. The temperature in the barrel of the second extruder 5 is preferably lower than the temperature in the first extruder 4 and slightly higher than the melting point of the polymer mixture to be used. For example, when the melting point of the polymer mixture to be used is 132° C., the temperature and the pressure in the barrel of the first extruder 4 are adjusted to about 180–210° C. and about 50–150 atm, and the temperature and the pressure in the barrel of the second extruder 5 are about 130–140° C. and about 50–150 atm.

The melting point of the polyethylene mixture is the heat absorption peak as measured by a differential calorimeter at a temperature elevating rate of 10° C./min and a weight of 10 mg.

The conductor 8 continuously supplied from the conductor supply part 1 runs successively passing a preliminary heater 2, a crosshead 6 and a condenser 7. The mixture in the second extruder 5 is transferred to the crosshead 6 via the discharge end 51 and supplied onto the continuously running conductor 8. The supplied mixture foams upon extrusion into the atmosphere from the die (not shown) formed on the discharge end of the crosshead 6, and forms a foamed electrically insulating layer on the conductor 8. The foamed electrically insulating layer becomes cool while passing through the condenser 7 to give an insulating cable 9, which is then wound around a take-up device 10. Thereafter, an external conductor and sheath are applied to the thus-produced insulating cable 9 to give a coaxial insulating cable.

The present invention is explained in detail by referring to the following illustrative Examples and Comparative Examples. The present invention is not limited by these examples in any way.

EXAMPLE 1–11, COMPARATIVE EXAMPLES 1–8

The mixtures having the compositions as shown in Tale 1 were kneaded in a Banbury mixer at 160° C., pelletized in a pelletizer to give foamable compositions of Examples 1–11 and Comparative Examples 1–8 in about 2 mm square pellets.

TABLE 1

| | Base polymer | | | | | | | |
|---|---|---|---|---|---|---|---|---|
| | LDPE | | | HDPE | | | HDPE/LPE | Shear | |
| | Density (g/cm³) | SR (%) | MFR | Density (g/cm³) | SR (%) | MFR | ratio (%/%) | viscosity (poise) | Kind of nucleator |
| Ex. 1 | 0.919 | 57 | 1.8 | 0.963 | 18 | 8.0 | 80/20 | 3000 | PTFE |
| Ex. 2 | 0.919 | 53 | 3.5 | 0.952 | 22 | 8.2 | 80/20 | 2655 | PTFE |
| Ex. 3 | 0.919 | 57 | 1.8 | 0.963 | 18 | 8.0 | 80/20 | 3000 | PFA |
| Ex. 4 | 0.919 | 57 | 1.8 | 0.963 | 18 | 8.0 | 80/20 | 3000 | ETFE |
| Ex. 5 | 0.913 | 60 | 0.8 | 0.945 | 25 | 6.5 | 80/20 | 3050 | PTFE |
| Ex. 6 | 0.922 | 55 | 2.0 | 0.967 | 30 | 5.5 | 80/20 | 2900 | PTFE |
| Ex. 7 | 0.919 | 57 | 1.8 | 0.963 | 18 | 8.0 | 55/45 | 3050 | PTFE |
| Ex. 8 | 0.920 | 45 | 3.0 | 0.950 | 40 | 5.6 | 80/20 | 2800 | PTFE |
| Ex. 9 | 0.922 | 50 | 3.5 | 0.967 | 30 | 5.5 | 80/20 | 2900 | PTFE |
| Ex. 10 | 0.919 | 53 | 3.5 | 0.963 | 18 | 8.0 | 80/20 | 3100 | BN |
| Ex. 11 | 0.919 | 57 | 1.8 | 0.952 | 22 | 8.2 | 80/20 | 3000 | BN |
| Com. Ex. 1 | 0.919 | 53 | 3.5 | 0.945 | 52 | 0.9 | 65/35 | 3250 | PTFE |
| Com. Ex. 2 | 0.919 | 57 | 1.8 | 0.963 | 18 | 6.0 | 80/20 | 3000 | ADCA |
| Com. Ex. 3 | 0.905 | 60 | 2.0 | 0.963 | 18 | 8.0 | 80/20 | 3100 | PTFE |
| Com. Ex. 4 | 0.927 | 45 | 1.5 | 0.963 | 18 | 8.0 | 80/20 | 3000 | PTFE |
| Com. Ex. 5 | 0.919 | 53 | 3.5 | 0.963 | 18 | 8.0 | 45/55 | 3400 | PTFE |
| Com. Ex. 6 | 0.920 | 45 | 3.0 | 0.965 | 53 | 4.0 | 80/20 | 2900 | PTFE |
| Com. Ex. 7 | 0.922 | 50 | 3.5 | 0.955 | 20 | 3.0 | 80/20 | 3100 | PTFE |
| Com. Ex. 8 | 0.919 | 57 | 1.8 | 0.963 | 22 | 8.0 | 80/20 | 3100 | OBSH |

The nucleator used had an average particle size within the range of 0.2–10 μm, and the amount used thereof was 0.5 part by weight per 100 parts by weight of the polyethylene mixture.

EXAMPLES 12–22, COMPARATIVE EXAMPLES 9–18

Coaxial insulating cables having an electrically insulating 10 layer consisting of a foam prepared from each foamable composition were produced using the foamable compositions of respective Examples and Comparative Examples as shown in Table 1 and a production apparatus as shown in FIG. 1 having a 65 mmφ–90 mmφ two-shot extruder. The argon gas used as the foaming agent was injected into the extruder from the barrel of the first extruder and an electrically insulating layer having an outer diameter of 22.4 mm, which was made of a foam of the foamable composition, was formed on a copper tube having an outer diameter of 9.1 mmφ. In so doing, the supply amount of the argon gas was gradually increased to maximize the expansion ratio of the electrically insulating layer. An external conductor having an outer diameter of 25.1 mm was formed on the electrically insulating layer and a polyethylene sheath was formed thereon to give the above-mentioned cable.

The expansion ratio of the electrically insulating layer of each coaxial insulating cable obtained and the acceptance evaluation results based on the attenuation amount are shown in Table 2. The attenuation of the coaxial cable was measured using WILTRON 54111A, and the attenuation at 2 GHz of less than 6.3 dB/100 m was evaluated as acceptable and the attenuation of not less than 6.3 dB/100 m was evaluated as unacceptable.

TABLE 2

| | Expansion ratio (%) of electrically insulating layer | Attenuation of coaxial insulating cable |
|---|---|---|
| Example 12 | 80 | acceptable |
| Example 13 | 79 | acceptable |
| Example 14 | 80 | acceptable |

TABLE 2-continued

| | Expansion ratio (%) of electrically insulating layer | Attenuation of coaxial insulating cable |
|---|---|---|
| Example 15 | 80 | acceptable |
| Example 16 | 78 | acceptable |
| Example 17 | 76 | acceptable |
| Example 18 | 81 | acceptable |
| Example 19 | 77 | acceptable |
| Example 20 | 76 | acceptable |
| Example 21 | 79 | acceptable |
| Example 22 | 80 | acceptable |
| Comparative Example 9 | 80 | unacceptable |
| Comparative Example 10 | 78 | unacceptable |
| Comparative Example 11 | 80 | unacceptable |
| Comparative Example 12 | 68 | unacceptable |
| Comparative Example 13 | 65 | unacceptable |
| Comparative Example 14 | 60 | unacceptable |
| Comparative Example 15 | 58 | unacceptable |
| Comparative Example 16 | 80 | unacceptable |

From Table 2, it is evident that the cable of each Example showed superior attenuation property but the coaxial cable of each Comparative Example showed inferior attenuation property.

As is evident from the above-mentioned Examples and Comparative Examples, since the foam obtained from the foamable composition of the present invention is superior in the electric property, particularly attenuation property, at a high frequency band, the coaxial insulating cable of the present invention, which has an electrically insulating foam layer, is extremely suitable for a high frequency coaxial cable, particularly a trunk line of CATV and a feeder antenna of a portable communication device such as cellular phones.

This application is based on a patent application No. 205404/1999 filed in Japan, the content of which is hereby incorporated by reference.

What is claimed is:

1. A foamable composition comprising a base polymer comprising a polyethylene mixture consisting of a low density polyethylene having a density of 0.91–0.925 g/cm³ and a high density polyethylene having a density of 0.94–0.97 g/cm³, and a fluororesin powder as a nucleator, wherein the high density polyethylene has a swelling rate smaller than that of the low density polyethylene and a melt flow rate greater than that of the low density polyethylene, and is contained in a proportion of not less than 50 percent by weight of the polyethylene mixture, and the base polymer has a shear viscosity of not more than 3150 poise at a temperature of 170° C. and a shear rate of 1216 sec$^{-1}$.

2. The foamable composition of claim 1, wherein the high density polyethylene has a melt flow rate of not less than 5 g/10 min.

3. A coaxial insulating cable comprising an electrically insulating layer formed of a foam having an expansion ratio of not less than 70%, which is obtained by foaming, using an inert gas as a foaming agent, a foamable composition comprising a base polymer comprising a polyethylene mixture consisting of a low density polyethylene having a density of 0.91–0.925 g/cm³ and a high density polyethylene having a density of 0.94–0.97 g/cm³, and a fluororesin powder as a nucleator, wherein the high density polyethylene has a swelling rate smaller than that of the low density polyethylene and a melt flow rate greater than that of the low density polyethylene, and is contained in a proportion of not less than 50 percent by weight of the polyethylene mixture, and the base polymer has a shear viscosity of not more than 3150 poise at a temperature of 170° C. and a shear rate of 1216 sec$^{-1}$.

4. The coaxial insulating cable of claim 3, wherein the high density polyethylene has a melt flow rate of not less than 5 g/10 min.

* * * * *